Feb. 7, 1961
D. F. KAMPE
2,970,656
HARROW
Filed March 17, 1958
4 Sheets-Sheet 1
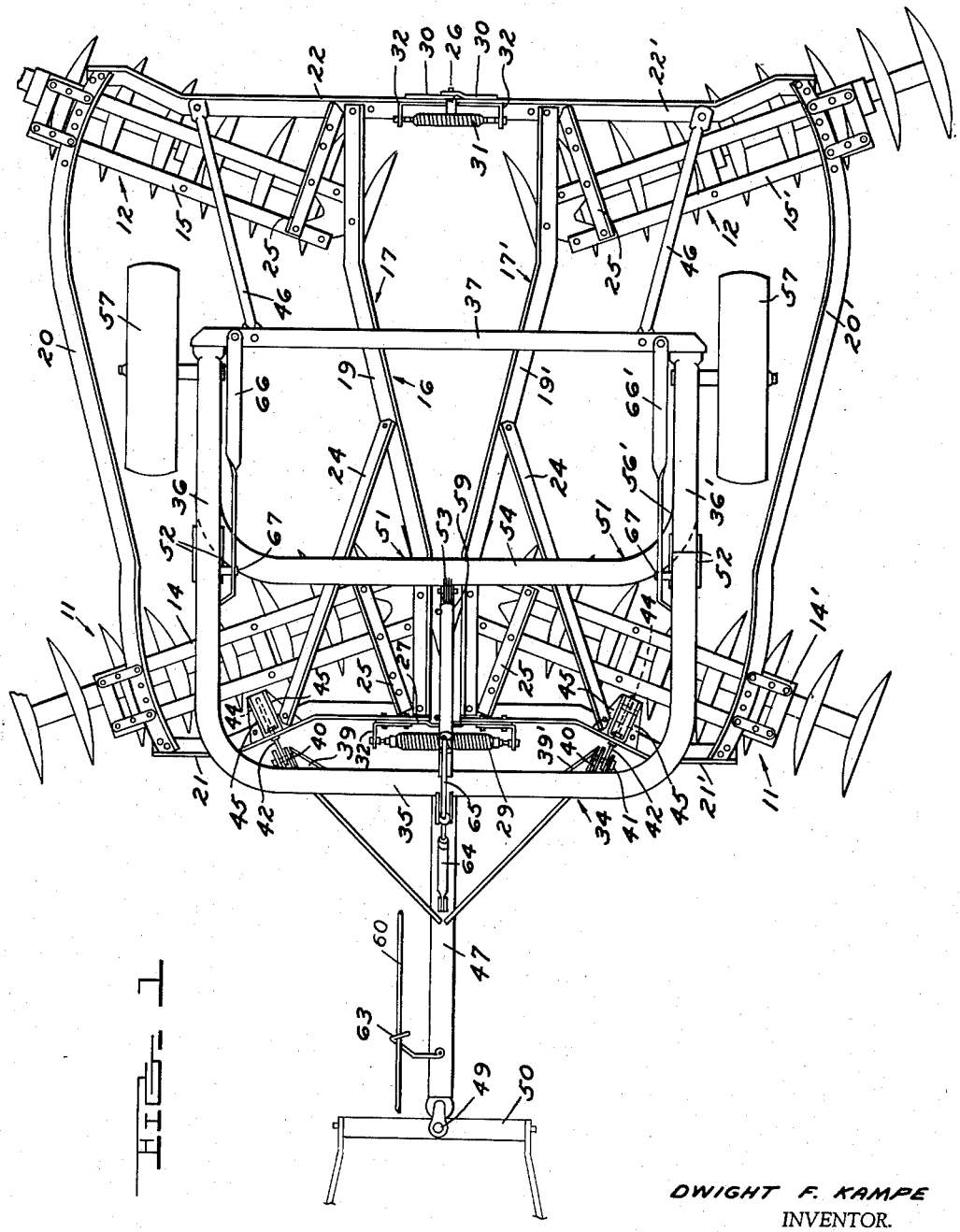
DWIGHT F. KAMPE
INVENTOR.
BY E. C. McRAE
J. R. FAULKNER
P. F. HILDER
ATTORNEYS

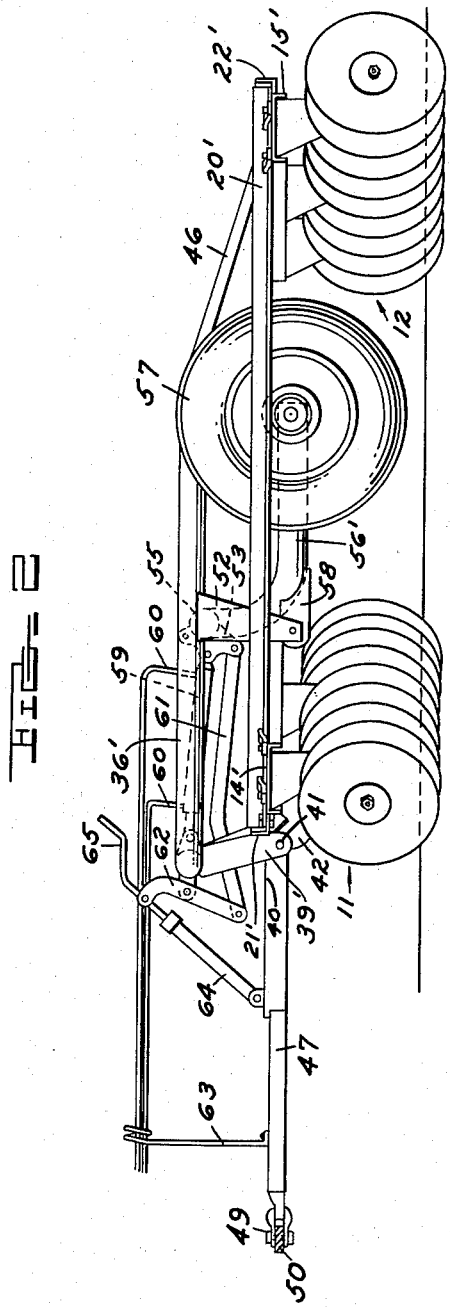

Feb. 7, 1961  D. F. KAMPE  2,970,656
HARROW
Filed March 17, 1958  4 Sheets-Sheet 3
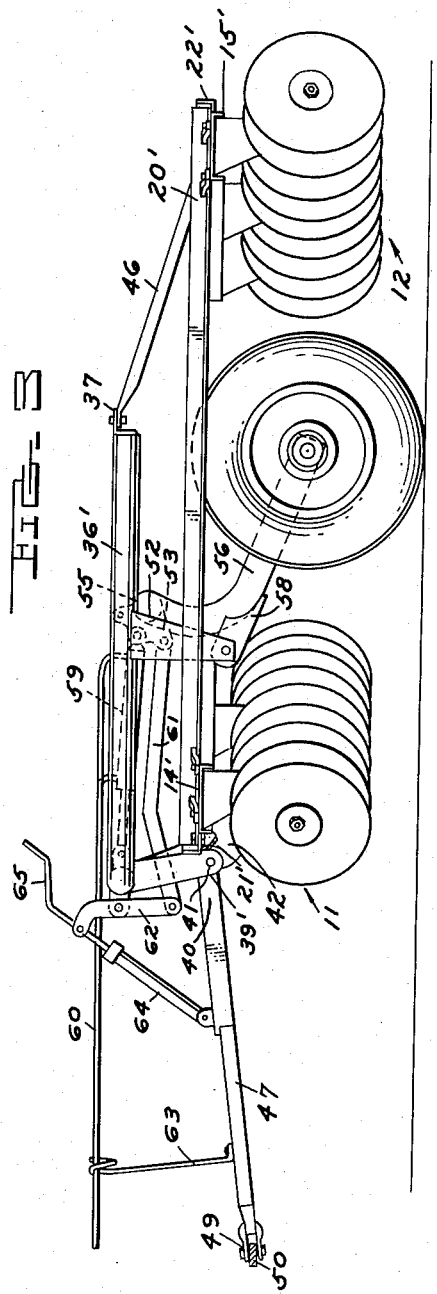
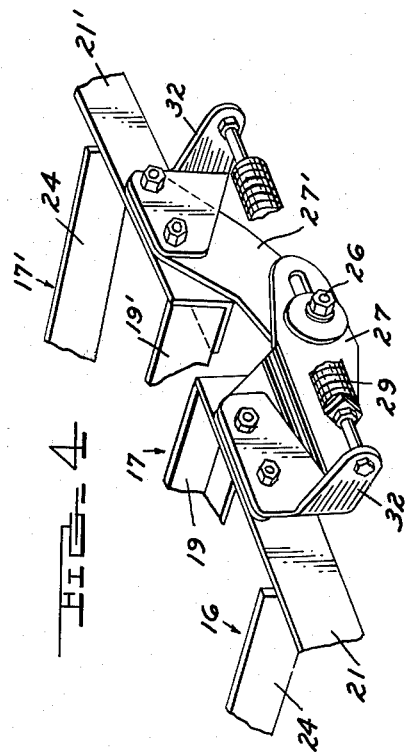
DWIGHT F. KAMPE
INVENTOR.
BY E. C. McRAE
J. R. FAULKNER
P. F. HILDER
ATTORNEYS Feb. 7, 1961

D. F. KAMPE 2,970,656

HARROW

Filed March 17, 1958

DWIGHT F. KAMPE
INVENTOR.

BY E. C. M<sup>c</sup>RAE
J. R. FAULKNER
P. F. HILDER

ATTORNEYS

United States Patent Office 2,970,656
Patented Feb. 7, 1961

2,970,656

HARROW

Dwight F. Kampe, Birmingham, Mich., assignor to Ford Motor Company, Dearborn, Mich., a corporation of Delaware Filed Mar. 17, 1958, Ser. No. 721,859

9 Claims. (Cl. 172—413)

This invention relates to harrows, and more particularly to a wheel transport disc harrow adapted to be pulled behind a tractor.

Disc harrows of the pull-behind type sometimes are provided with transport wheels which may be raised or lowered by a hydraulic cylinder, the wheels when lowered serving to raise the harrow discs from contact with the ground and provide for transport of the harrow, making it unnecessary to provide for deangling of the gangs (rotating the gangs to a position in which the individual discs lie generally in fore and aft planes). In addition, the transport wheels of certain harrows may be partially lowered to be used as gauge wheels for limiting the penetration of the gangs in soft ground.

The present invention comprises a wheel transport tandem disc harrow in which the individual harrow gangs are mounted on a generally horizontally sub-frame which is supported by linkage from a main frame located above the sub-frame, the links transmitting draft from the main frame to the sub-frame and gangs. The transport wheels are carried on a wheel frame which is pivotally mounted on the main frame and which may be raised and lowered varying amounts by a remote-controlled hydraulic cylinder actuated from a tractor hydraulic system.

Among the constructional features of the present invention is an improved mounting of the sub-frame for the main frame whereby the harrow has a high degree of flexibility to (1) permit it to ride over obstructions without raising the entire harrow, (2) permit it to conform to irregularities of the ground for substantially equal penetration by both the front and rear gangs and for both ends of the gangs.

Among the objects of the present invention are to provide an improved wheel transport tandem disc harrow having greater flexibility; to provide such a harrow which will readily adjust to irregularities of the ground and in which the gangs will uniformly penetrate in various types of soil to the depth desired; to provide such a harrow which is strong, durable and long lived; and generally to improve harrows of the type described.

Other objects, and objects relating to details of manufacture will be apparent from the written description to follow:

My invention is clearly defined in the appended claims. In the claims, as well as in the description, parts may at times be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming part of this specification in which:

Figure 1 is a somewhat diagrammatic top plan view of a harrow constructed according to the present invention, the extreme ends of the gangs of one side of the harrow being broken away for convenience of illustration and a tractor draw bar and draft links being indicated in broken lines.

Figure 2 is a side elevation of the harrow of Figure 1.

Figure 3 is a view similar to Figure 2, showing the harrow in transport position.

Figure 4 is an enlarged fragmentary view showing the pivotal connection of the forward portion of the sub-frame along its center line.

Figure 5:
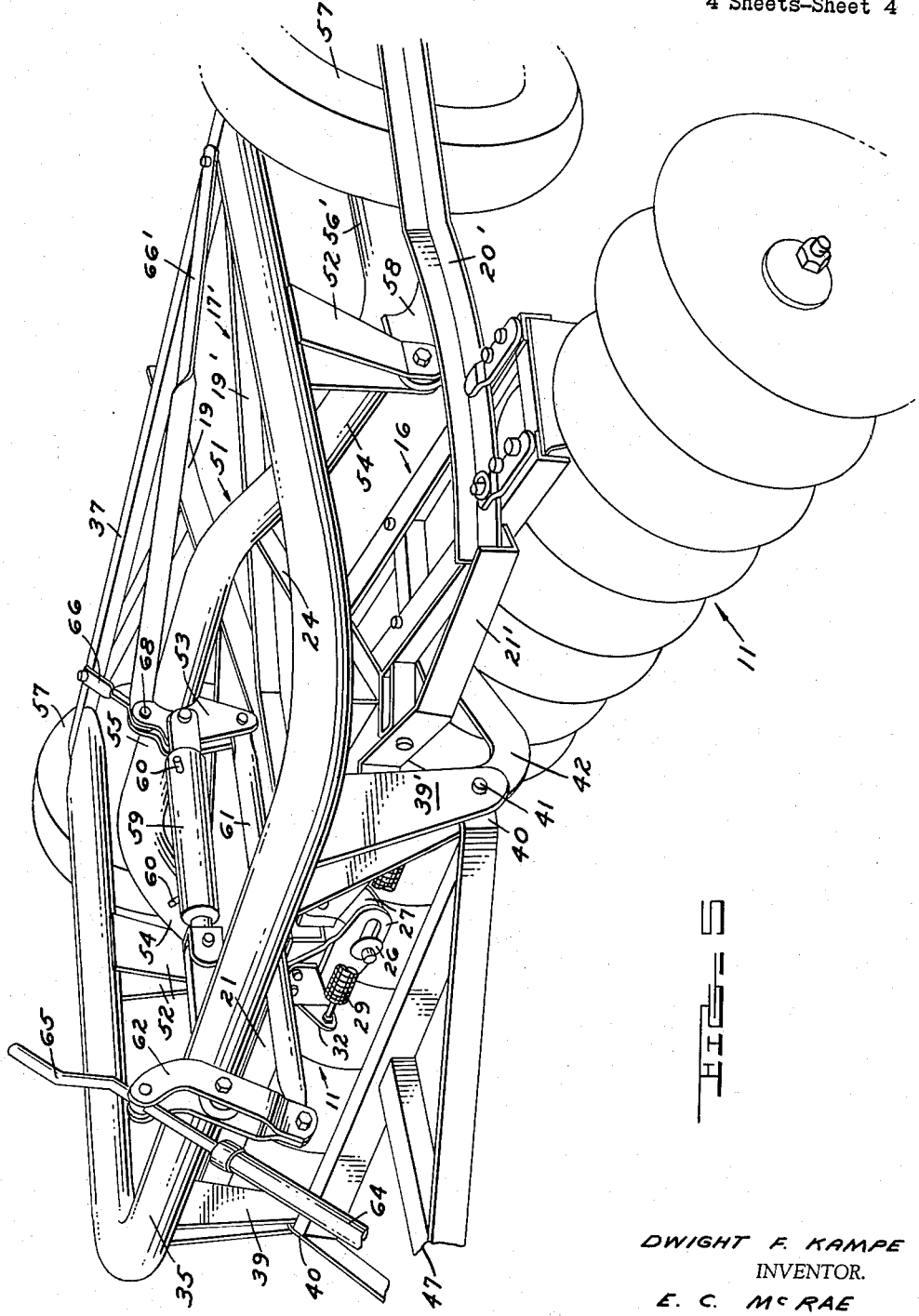
Figure 5 is an isometric view of the front portion of the harrow, the front of the tongue and the rear portion of the harrow being omitted.

Referring now to the drawings, the harrow of the present invention comprises a pair of front disc gangs 11, 11, and a pair of rear disc gangs 12, 12, each disc gang being formed of a plurality of dished or hollowed discs axially mounted in spaced relation along a rod extending generally transversely of the harrow. The disc gangs 11, 11 are mounted for rotation on their axes on the lower portions of a pair of front gang frames 14 and 14', the gang frames being similar but of opposite hand. Similarly, the rear disc gangs 12, 12, are mounted for rotation on a pair of rear gang frames 15 and 15' which are similar but of opposite hand. The construction of the gangs and their mounting on the gang frames is more or less conventional and does not form a part of the present invention. In accordance with usual practice, the discs of the front gangs are dished in opposite directions on the two sides of the harrow to eliminate side draft, and the discs of the rear gangs are correspondingly arranged for the same reason.

The disc gangs 11, 11 and 12, 12 are mounted to project downwardly from a harrow sub-frame 16, the sub-frame 16 preferably being formed of angle iron and lying generally in a horizontal plane. The sub-frame 16 is composed of two sub-frame halves 17 and 17' which are similar but of opposite hand (allochiral) and are articulated for pivotal movement about the longitudinal center line of the harrow to permit the harrow to adapt itself to irregularities of the ground, as will be explained.

The sub-frame halves 17 and 17' are provided with inner longitudinal members 19 and 19' respectively and outer longitudinal members 20 and 20' respectively which are shaped as indicated in the drawings. Front members 21 and 21' and rear members 22 and 22', respectively, connect the inner and outer members 19' and 20' so as to form the two generally rigid sub-frame halves 17 and 17'. A diagonal brace 24 braces each sub-frame half against distortion.

The inner ends of the front gang frames 14 and 14' and the rear gang frames 15 and 15' are pivotally connected to the undersides of the inner sub-frame members 19 and 19', respectively to provide for adjusting the angle of the gangs. The outer ends of the gang frames 14 and 15, and 14' and 15', are slidably received along arcuate sections of the outer members 20 and 20' respectively of the sub-frame. A series of holes along the length of the outer members 20 and 20' are provided to receive bolts or pins for locking the gang frames in adjusted position. Stabilizer arms 25 secured transversely to the tops of the front gang frames 14 and 14', and rear gang frames 15 and 15', overlap and slidingly engage the front and rear sub-frame members 21 and 21', and 22 and 22', to reinforce the gang frames against rocking on the sub-frame.

The front disc gangs 11, 11 abut against each other, and the angle at which the gangs are set, as shown in the drawings, presses the abutting ends of the gangs together as the harrow is pulled through the soil. In accordance with usual practice, dome-shaped bumper washers are placed on the abutting ends of the front gangs. The front members 21 and 21' of the sub-frame 16 are pivotally joined by a bolt 26 extending through overlapping, downwardly projecting brackets 27 and 27', secured to the members. The pivotal connection of the brackets 27 and 27' is located substantially below the general plane of the sub-frame 16, and preferably at least one of the brackets is slotted to permit the sub-frame halves 17 and 17' to pivot as required to conform to the surface of the ground while the inner ends of the front gangs 11, 11 remain in contact. If desired, a tension spring 29 may be provided connecting a pair of angles 32, 32 mounted on the front members 21 and 21' to bias the sub-frame halves 17 and 17' towards generally horizontal position during use of the harrow. The spring 29 is locatetd above the level of the contacting inner ends of the front gangs.

The inner ends of the rear sub-frame members 22 and 22' are pivotally connected by brackets 30, 30 which are generally similar to brackets 27, 27' connecting the sub-frame front members 21, 21'. A bolt 26 pivotally connects these two brackets and is located about the same distance below the sub-frame as the bolt pivotally connecting brackets 27 and 27'. Inasmuch as the rear gangs 12, 12 do not abut, the connection between the brackets 30, 30 is a simple pivotal connection and neither bracket is slotted. A compression spring 31 supported above the level of the bolt 26 by angles 32, 32 mounted on the rear members 22 and 22' helps to hold the sub-frame in a generally horizontal position during operation.

A harrow main frame 34 supports and transmits draft to the sub-frame 16. The main frame 34 preferably is comprised of a section of pipe bent to form a central transverse portion 35 and rearwardly directed end portions 36 and 36' connected at their rearward end by a strut 37, the pipe preferably lying in a single plane.

The main frame 34 is provided with a pair of downwardly extending brackets 39 and 39' which are formed of two spaced plates mounted to project from the underside of the transverse portion 35 of the frame. A tongue 40 which may be of braced T shape is pivotally connected to the lower ends of brackets 39, 39' by pins 41. An L-shaped link 42 pivotally mounted on each pin 41 connects the brackets 39, 39' with the front frame members 21, 21' of the harrow sub-frame 16. The links extend downwardly and rearwardly from the lower ends of the brackets 39, 39', and beneath the frame members 21, 21', being pivotally connected to the frame member by pins 44, 44 received by brackets 45, 45, extending rearwardly from the members 21, 21'. The pins 44, 44 are located several inches behind the members 21, 21'. During operation of the harrow, the pins 41, 41 and 44, 44 are more or less at the same elevation, the links 42, 42 swiveling as necessary to permit the front of the sub-frame 16 to rise or drop relative to the main frame 34.

The rear end of the main frame 34 is connected with the rear members 22, 22' of the harrow sub-frame by a pair of struts 46, 46, the struts extending between the end portions of the main frame strut 37 and the immediate portions of the sub-frame rear members 22 and 22'. The struts 46 are mounted at both ends thereof by bolted connections permitting limited universal movement. During operation of the harrow, the struts 46, 46 may be in either tension or compression and serve to control penetration of the rear gangs 12, 12.

Referring to Figure 1, it will be noted that draft is applied to the forward end 47 of the tongue 40 by a shackle 49, which can be connected to a tractor draw bar 50. The draft is transmitted through the tongue, the pins 41, 41 and the links 42, 42 to the harrow sub-frame 16 generally midway of the length of each front gang 11, the pins 41, 41 extending generally perpendicular to the line of draft (straight line connecting the forward end 47 of the tongue with the pin). In addition, the rear ends of the struts 46, 46 are connected with the rear sub-frame members 22 and 22' generally midway of the length of rear gangs 12, 12, the struts extending along the line of draft (line extending from the forward end 47 of the tongue to the point of attachment of the struts to the sub-frame 16).

A wheel frame 51 is pivotally mounted from a pair of brackets 52, 52 extending downwardly from the side portions 36, 36' of the main frame 34, each bracket 52 comprising a pair of spaced plates. The wheel frame is formed of pipe bent generally to the shape shown in the drawings to provide an upwardly arched transverse portion 54 having a central zone 55 which may be located generally in the plane of the main frame. The end portions 56, 56' of the wheel frame 51 project rearwardly, and a transport wheel 57 is located on each end of the frame, the transport wheels being mounted to rotate freely about a common transverse axis. A pair of brackets 58, 58 secured to the wheel frame 51 adjacent to the ends of the transverse portion 54 are pivotally connected to the brackets 52, 52 to support the wheel frame for pivotal movement on a transverse axis to lower and raise the wheels 57, 57.

A two-way hydraulic cylinder 59 is connected between the transverse portion 35 of the main frame and a bracket 53 mounted on the central zone 55 of the wheel frame for pivoting the wheel frame to raise and lower the transport wheels 57, 57. The hydraulic cylinder 59 is connected to the hydraulic system of a tractor, not shown, by a pair of hydraulic hoses 60, 60, supported by a hose support 63 mounted on the tongue 40. The arrangement is such that extension of the cylinder as indicated in Figure 3 will force the wheels 57, 57 downward against the ground to raise the harrow gangs off the ground. Retraction of the cylinder, as indicated in Figure 2, will raise the wheels 57, 57 so as first to lower the gangs into contact with the ground and then to raise the transport wheels well above the ground as indicated in Figure 2. If desired, the transport wheels 57, 57 may be held by the hydraulic cylinder 59 at a height slightly above the bottoms of the gangs 11, 11 and 12, 12, the wheels bearing a portion of the weight of the harrow and limiting penetration of the gangs.

A link 61 is pivotally connected to the wheel frame 51 immediately below the cylinder 59 and projects forwardly beyond the front of the main frame 34, being pivotally connected to a curved lever 62 pivotally mounted on the transverse portion 35 of the main frame. The opposite end of the curved lever 62 is connected to an intermediate portion of the tongue 40 by an adjustable length link 64 which may be of the screw type adjusted by an upwardly projecting crank 65. The crank 65 serves to adjust the length of link 64 so as to adjust the height of the forward end of the tongue 40. In addition, the links 61, 64, and the curved lever 62 steady the harrow against rotation about the axis of the transport wheels 57, 57 during transport. The connection of the link 61 to the wheel frame 51 serves to rotate the curved lever 62 and maintain the main frame 34 and sub-frame 16 generally level upon lifting the harrow for transport, the tongue 40 being inclined downwardly somewhat when the harrow is in transport position, as indicated in Figure 3. In addition, adjustment of the length of link 64 serves to regulate the relative ground penetration of the front and rear disc gangs 11, 11 and 12, 12. By extending the link 64, the plane of the main frame 34 is inclined downwardly rearwardly so as to cause the rear gangs to cut more deeply, while shortening the length of link 64 tends to cause the front gangs to cut more deeply.

Upon actuation of the hydraulic cylinder 59, the transport wheels 57, 57 are lowered until they contact the ground and, upon further movement of the cylinder, the main frame 34 is raised. As the main frame 34 rises, the L shaped links 42, 42 swing until the links are resting against the under-side of the front frame members 21, 21' of the sub-frame, after which the front end of the sub-frame rises with the main frame. The struts 46, 46 serve to support the rear members 22, 22' of the sub-frame from the main frame, thus completely supporting the sub-frame and gangs. Rocking of the main frame and sub-frame as a unit about the axis of the transport wheels 57, 57 during transport is prevented by the adjustable linkage between the tongue 40 and the transverse portion 35 of the main frame.

For transport of the harrow for longer distances or to hold the harrow in raised position when parked, transport lock straps 66, 66' are provided which are pivotally mounted adjacent the ends of the rear strut 37 of the main frame 34. When not needed, these straps may be supported beside the side portions 36, 36' of the main frame, being received by clips 67, 67. In use, the forward ends of the straps 66, 66' are moved centrally of the main frame and connected by a pin or bolt received within a hole 68 in the cylinder bracket 53. When the lock straps 66, 66' are used, the cylinder may be removed if desired and the harrow will remain in raised position.

I claim:

1. A wheel transport tandem disc harrow having a generally horizontal sub-frame, pairs of opposed front and rear disc gangs, gang frames supporting the disc gangs and mounted on the sub-frame, a main frame generally above the level of the sub-frame, a tongue extending forwardly from the main frame for connection to a tractor, a draft transmitting connection extending between the main frame and the sub-frame, a wheel frame pivotally mounted on the main frame for rotation about a transverse axis and rotatably supporting a pair of transport wheels, a hydraulic cylinder for rotating the wheel frame about its axis to force the wheels downwardly into ground engaging position and raise the harrow for transport, and a lock strap pivotally connected with the main frame and movable into position engaging the wheel frame to retain the wheel frame in wheel-lowered position.

2. A tandem disc harrow having a laterally symmetrical, generally horizontal sub-frame formed of two allochiral sections pivoted together along the longitudinal center line of the sub-frame, pairs of opposed front and rear disc gangs, gang frames supporting the disc gangs and mounted on the sub-frame symmetrically with respect to said center line, a main frame above the level of the sub-frame, linkage supporting the sub-frame from the main frame for rocking and pitching movement and transmitting draft from the main frame to the sub-frame, and a tongue extending forwardly from the main frame for connection to a tractor.

3. A wheel transport tandem disc harrow having a laterally symmetrical, generally horizontal sub-frame formed of two allochiral sections pivoted together along the longitudinal center line of the sub-frame, pairs of opposed front and rear disc gangs, gang frames supporting the disc gangs and mounted on the sub-frame symmetrically with respect to said center line, a main frame generally above the level of the sub-frame, a wheel frame pivotally mounted on the main frame for rotation about a horizontal transverse axis and rotatably supporting a pair of transport wheels, relatively short links capable of limited universal movement connecting the front of the main frame with the front of the sub-frame, rearwardly downwardly inclined struts capable of limited universal movement connecting the rear of the main frame to the rear of the sub-frame to transmit draft, a tongue extending forwardly from the main frame for connection to a tractor, and means for rotating said wheel frame about its axis for raising and lowering the transport wheels.

4. A wheel transport tandem disc harrow having a laterally symmetrical, generally horizontal sub-frame formed of two allochiral sections pivoted together along the longitudinal center line of the sub-frame, pairs of opposed front and rear disc gangs, gang frames supporting the disc gangs and mounted on the sub-frame symmetrically with respect to said center line, a main frame above the level of the sub-frame and provided with a pair of spaced downwardly extending brackets positioned in front of the sub-frame, relatively short links connecting the brackets of the main frame to the forward portion of the sub-frame, a pair of spaced relatively longer links extending rearwardly and downwardly from the rear portion of the main frame to the rear portion of the sub-frame, a wheel frame pivotally mounted on the main frame for rotation about a horizontal transverse axis and rotatably supporting a pair of transport wheels, means for rotating said wheel frame about its axis for raising and lowering the transport wheels, and a tongue extending forwardly from the main frame for connection to a tractor.

5. A wheel transport tandem disc harrow having a laterally symmetrical, generally horizontal sub-frame formed of two allochiral sections pivoted together along the longitudinal center line of the sub-frame, pairs of opposed front and rear disc gangs, gang frames supporting the disc gangs and mounted on the sub-frame symmetrically with respect to said center line, a main frame above the level of the sub-frame and provided with a pair of spaced downwardly extending brackets positioned in front of the sub-frame, relatively short, rigid links connecting the brackets of the main frame to the forward portion of the sub-frame, said links extending beneath the forward edge of the sub-frame and being pivotally connected to the sub-frame a short distance behind said edge, a pair of spaced relatively longer links extending rearwardly and downwardly from the rear portion of the main frame to the rear portion of the sub-frame, a wheel frame pivotally mounted on the main frame for rotation about a horizontal transverse axis and rotatably supporting a pair of transport wheels, means for rotating said wheel frame about its axis for raising and lowering the transport wheels, and a tongue extending forwardly from the main frame for connection to a tractor.

6. A wheel transport tandem disc harrow having a laterally symmetrical, generally horizontal sub-frame formed of two allochiral sections pivoted together along the longitudinal center line of the sub-frame, pairs of opposed front and rear disc gangs, gang frames supporting the disc gangs and mounted on the sub-frame symmetrically with respect to said center line, a main frame above the level of the sub-frame, a wheel frame pivotally mounted on the main frame for rotation about a horizontal transverse axis and rotatably supporting a pair of transport wheels, linkage supporting the sub-frame from the main frame for rocking and pitching movement and transmitting draft from the main frame to the sub-frame, a tongue extending forwardly from the main frame for connection to a tractor, and means for rotating said wheel frame about its axis for raising and lowering the transport wheels.

7. A wheel transport tandem disc harrow having a generally horizontal sub-frame, pairs of opposed front and rear disc gangs, gang frames supporting the disc gangs and mounted on the sub-frame, a main frame generally above the level of the sub-frame and having rearwardly extending side portions, a tongue extending generally forwardly from the main frame for connection to a tractor, a draft transmitting connection extending between the main frame and the sub-frame, a wheel frame pivotally mounted on the side portions of the main frame for rotation about a transverse axis and rotatably supporting a pair of transport wheels, the wheel frame having a portion extending transversely of the harrow between the side portions of the main frame, a hydraulic cylinder for rotating the wheel frame about its axis to force the wheels downwardly into ground engaging position and raise the harrow for transport, and a pair of lock straps pivotally connected with the main frame adjacent the rear ends of the side portions and movable into position engaging the transversely extending portion of the wheel frame midway between the side portions of the main frame to retain the wheel frame in wheel lowered position.

8. A wheel transport tandem disc harrow having a generally horizontal sub-frame, pairs of opposed front and rear disc gangs, gang frames supporting the disc gangs and mounted on the sub-frame, a main frame generally above the level of the sub-frame and having a transversely extending front portion and rearwardly extending side portions, a tongue extending forwardly from the main frame for connection to a tractor, a draft transmitting connection extending between the main frame and the sub-frame, a wheel frame pivotally mounted on the side portions of the main frame for rotation about a transverse axis, having a portion extending transversely of the harrow between the side portions of the main frame above the level of the pivotal mountings, and rotatably supporting a pair of transport wheels, and a hydraulic cylinder extending between the transverse portion of the main frame and the transverse portion of the wheel frame for rotating the wheel frame about its axis to force the wheels downwardly into ground engaging position and raise the harrow for transport.

9. A wheel transport tandem disc harrow having a generally horizontal sub-frame, pairs of opposed front and rear disc gangs, gang frames supporting the disc gangs and mounted on the sub-frame, a main frame generally above the level of the sub-frame and having a transversely extending front portion and rearwardly extending side portions, a tongue extending forwardly from the main frame for connection to a tractor, a draft transmitting connection extending between the main frame and the sub-frame, a wheel frame pivotally mounted on the side portions of the main frame for rotation about a transverse axis, having a portion extending transversely of the harrow between the side portions of the main frame above the level of the pivotal mountings, and rotatably supporting a pair of transport wheels, a hydraulic cylinder extending between the transverse portion of the main frame and the transversely extending portion of the wheel frame for rotating the wheel frame about its axis to force the wheels downwardly into ground engaging position and raise the harrow for transport, a generally vertically extending lever pivotally mounted between its ends on the transverse portion of the main frame, a link extending generally parallel to and beneath the cylinder and connecting the lower end of said lever with the transverse portion of the wheel frame, and an adjustable length link connecting the upper end of said lever with the tongue.

References Cited in the file of this patent

UNITED STATES PATENTS

| | | |
|---|---|---|
| 2,469,622 | Acton | May 10, 1949 |
| 2,704,018 | Oehler | Mar. 15, 1955 |
| 2,708,333 | Cooney | May 17, 1955 |
| 2,717,479 | Scheidenhelm | Sept. 13, 1955 |
| 2,738,634 | Garver | Mar. 20, 1956 |
| 2,760,323 | Cooper | Aug. 28, 1956 |
| 2,765,609 | Oehler | Oct. 9, 1956 |
| 2,765,610 | Oehler | Oct. 9, 1956 |
| 2,767,538 | Scheidenhelm | Oct. 23, 1956 |
| 2,797,542 | Webster et al. | July 2, 1957 |

FOREIGN PATENTS

| | | |
|---|---|---|
| 3,831 | Great Britain | 1876 |